(12) United States Patent
Lee et al.

(10) Patent No.: US 10,928,682 B2
(45) Date of Patent: Feb. 23, 2021

(54) DISPLAY DEVICE AND METHOD FOR MANUFACTURING THE SAME

(71) Applicant: LG Display Co., Ltd., Seoul (KR)

(72) Inventors: HaJoong Lee, Gyeonggi-do (KR); Kyungmin Yeo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/279,908

(22) Filed: Feb. 19, 2019

(65) Prior Publication Data

US 2019/0179202 A1 Jun. 13, 2019

Related U.S. Application Data

(62) Division of application No. 15/592,582, filed on May 11, 2017, now Pat. No. 10,254,589.

(30) Foreign Application Priority Data

Jun. 30, 2016 (KR) .................. 10-2016-0082786

(51) Int. Cl.
*G02F 1/1337* (2006.01)
*G02F 1/1333* (2006.01)

(52) U.S. Cl.
CPC ...... *G02F 1/133723* (2013.01); *G02F 1/1337* (2013.01); *G02F 1/133345* (2013.01); *G02F 1/133788* (2013.01); *G02F 2001/133397* (2013.01); *G02F 2001/133738* (2013.01); *G02F 2202/103* (2013.01)

(58) Field of Classification Search
CPC ......... G02F 1/133723; G02F 1/133345; G02F 1/1337
See application file for complete search history.

(56) References Cited

U.S. PATENT DOCUMENTS

| 2010/0165277 A1* | 7/2010 | Hwang ................. G02F 1/1337 349/123 |
| 2011/0051064 A1* | 3/2011 | Matsumori ....... G02F 1/133711 349/123 |
| 2011/0090444 A1 | 4/2011 | Kimura |

(Continued)

FOREIGN PATENT DOCUMENTS

| CN | 101770116 A | 7/2010 |
| CN | 105308498 A | 2/2016 |
| JP | 2010072011 A | 4/2010 |

OTHER PUBLICATIONS

First Notification of Office Action dated Jun. 1, 2020, issued in corresponding Chinese Patent Office Action No. 201710305283.4.

*Primary Examiner* — Michael H Caley
*Assistant Examiner* — Mariam Qureshi
(74) *Attorney, Agent, or Firm* — Morgan, Lewis & Bockius LLP

(57) ABSTRACT

A display device and a method of manufacturing the same are disclosed. The display device comprises a thin film transistor on a substrate, a protective film on the thin film transistor, and an alignment film on the protective film. The protective film includes one or more protective films, and a protective film adjacent to the alignment film among the one or more protective films has a silicon content higher than a nitrogen content. Thus, it is possible to provide a display device capable of reducing image sticking or flicker.

20 Claims, 3 Drawing Sheets

(56) References Cited

U.S. PATENT DOCUMENTS

| | | | |
|---|---|---|---|
| 2011/0199565 A1* | 8/2011 | Kunimatsu | G02F 1/133723 |
| | | | 349/123 |
| 2014/0368775 A1* | 12/2014 | Park | G02F 1/133723 |
| | | | 349/123 |
| 2016/0033825 A1 | 2/2016 | Matsui et al. | |
| 2016/0103369 A1 | 4/2016 | Imanishi | |
| 2016/0377931 A1* | 12/2016 | Choi | G02F 1/134309 |
| | | | 349/43 |
| 2017/0090222 A1* | 3/2017 | Zhang | B01D 46/00 |

* cited by examiner

DISPLAY DEVICE AND METHOD FOR MANUFACTURING THE SAME

CROSS-REFERENCE TO RELATED APPLICATIONS

This application is a Divisional of U.S. patent application Ser. No. 15/592,582, filed May 11, 2017, which claims the benefit of Korean Patent Application No. 10-2016-0082786 filed on Jun. 30, 2016, in the Korean Intellectual Property Office, the disclosures of which are incorporated herein by reference.

BACKGROUND

Technical Field

The present disclosure relates to a display device and a method for manufacturing the same, and more particularly, to a display device capable of reducing image sticking or flicker and a method for manufacturing the same.

Description of the Related Art

Recently, as the world entered the information age, the field of display for visually displaying electrical information signals has grown rapidly. Thus, various display devices with performance, such as thinning, weight lightening, and low power consumption have been developed.

Specific examples of the display devices include a Liquid Crystal Display (LCD) device, a Plasma Display Panel (PDP) device, a Field Emission Display (FED) device, an Organic Light Emitting Display (OLED) device, and the like.

Particularly, the liquid crystal display (LCD) device is a display device for displaying an image by transmitting or blocking light generated from a light source. In the LCD device, the light source is disposed under liquid crystal and an electric field is applied to the liquid crystal to control alignment of the liquid crystal. The LCD device has a small thickness and can realize a clear image and thus has been applied to a TV, a monitor, and the like. Recently, the LCD device has been used as a display device for a portable terminal such as a smartphone, and a tablet PC.

SUMMARY

An LCD device may employ one of twisted nematic (TN), vertical alignment (VA), in-plane-switching (IPS) modes, and the like. Particularly, in an LCD device employing the IPS mode, electrodes for controlling a liquid crystal (LC) and generating an electric field are present on a single substrate. Since the electrodes are aligned on the single substrate, an electric filed is induced mainly in a horizontal direction. Therefore, the LCD device has very low viewing angle dependence as compared with LCD devices employing TN and VA modes. Further, in an LCD device employing a fringe-field-switching (FFS) mode, electrodes may be formed on a single substrate with a smaller electrode gap. Thus, a horizontal direction electric field may also be generated in areas above the electrodes.

Also, the LCD device includes an alignment film for aligning a liquid crystal layer. The alignment film is classified into a rubbing alignment film and a photo-alignment film. The rubbing alignment film is formed of polyimide, and by rubbing the alignment film with fiber such as rayon fiber, an alignment controlling force is imparted to the alignment film. A rubbing process may cause problems such as light leakage or image sticking occurring due to disclination caused by scratches formed due to steps of thin film transistors formed on a substrate. Further, the fiber such as rayon fiber may generate static electricity, and the static electricity may affect the reliability of the display device. Herein, the image sticking refers to the phenomenon that even when an LCD device is switched to a new screen, an image or character displayed on a previous screen still remains and appears on the new screen. That is, the image sticking refers to the phenomenon that a visual experience lasts for a certain period of time even after an external stimulus disappears.

The photo-alignment film is formed of a polymer material, for example, polyimide, and by irradiating light such as ultraviolet (UV) rays thereto, an alignment controlling force is imparted to the alignment film. Therefore, static electricity is not generated in the photo-alignment film unlike the rubbing alignment film, and image sticking less occurs.

Further, recently, rather than a liquid crystal layer with positive dielectric anisotropy, a liquid crystal layer with negative dielectric anisotropy has been used since it is less affected by the flexo-electric effect, resulting in less flicker and the transmittance can be improved. However, the liquid crystal layer with negative dielectric anisotropy has a lower response time than the liquid crystal layer with positive dielectric anisotropy, and requires a high voltage, resulting in the occurrence of image sticking.

Therefore, efforts to apply the photo-alignment film to the liquid crystal layer with negative dielectric anisotropy have continued. However, it is recognized that it is difficult to apply the photo-alignment film due to image sticking.

And, if a display device is applied to a mobile device, a variable driving mode in which a frequency of a voltage applied to the display device is changed is employed to reduce power consumption and increase response speed in a touch. If the variable driving mode is employed, electric charges are generated according to a certain change of frequency and a switch of polarity. It is recognized that the electric charges are accumulated on the alignment film, resulting in the occurrence of image sticking or flicker.

Accordingly, the inventors of the present disclosure recognized the above-described problems and conducted various experiments for improvement of image sticking or flicker. As a result, the inventors of the present disclosure invented a display device capable of reducing image sticking or flicker through the experiments.

Accordingly, embodiments of the present disclosure are directed to a display device that substantially obviates one or more of the problems due to limitations and disadvantages of the related art.

An object to be achieved by the present disclosure is to provide a display device capable of reducing image sticking or flicker and a method for manufacturing the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display device comprises a thin film transistor on a substrate, a protective film on the thin film transistor, and an alignment film on the protective film. The protective film includes one or more protective films, and a protective film adjacent to the alignment film among the one or more protective films has a silicon content higher than a nitrogen content.

In another aspect, a display device comprises a pixel electrode and a common electrode on at least one of a first substrate and a second substrate, a first alignment film and a second alignment film on the first substrate and the second substrate, respectively, a liquid crystal layer between the first substrate and the second substrate, the liquid crystal layer having negative dielectric anisotropy, and a protective film adjacent to the liquid crystal layer and having a lower volume resistance than a volume resistance the first alignment film.

In another aspect, a method for manufacturing a display device comprises forming a thin film transistor on a first substrate, forming a protective film on the thin film transistor, forming an alignment film on the protective film, irradiating a light to the alignment film, removing an impurity or a degradation product of the alignment film, and forming a liquid crystal layer between the first substrate and a second substrate facing the first substrate. The protective film adjacent to the liquid crystal layer is formed to have a lower volume resistance than a volume resistance of the alignment film.

Details of other exemplary embodiments will be included in the detailed description of the disclosure and the accompanying drawings.

According to the present disclosure, a protective film adjacent to an alignment film has a silicon content higher than a nitrogen content. Thus, the volume resistance of the protective film adjacent to the alignment film may be reduced. Therefore, image sticking or flicker caused by the alignment film having a higher volume resistance than the protective film may be reduced.

And, according to the present disclosure, a bonding ratio of silicon and nitrogen in the protective film adjacent to the alignment film is 1 or less. Thus, the volume resistance of the protective film adjacent to the alignment film may be reduced. Therefore, image sticking or flicker caused by the alignment film having a higher volume resistance than the protective film may be reduced.

And, according to the present disclosure, the protective film adjacent to the alignment film has a lower volume resistance than the alignment film. Thus, image sticking or flicker of the display device may be reduced.

And, according to the present disclosure, the protective film adjacent to the alignment film has a lower volume resistance than the alignment film. Thus, DC discharge characteristics in a variable driving mode may be improved. Therefore, image sticking or flicker of the display device may be reduced.

And, according to the present disclosure, the protective film adjacent to the alignment film has a lower volume resistance than the alignment film and a liquid crystal layer with negative dielectric anisotropy is employed. Thus, it is possible to provide a display device which may be improved in transmittance and in which image sticking or flicker may be reduced.

And, according to the present disclosure, the protective film adjacent to the alignment film has a lower volume resistance than the alignment film and the variable driving mode and the liquid crystal layer with negative dielectric anisotropy are employed. Thus, it is possible to provide a display device which can be improved in power consumption, response speed in touch of the display device, and transmittance and in which image sticking or flicker may be reduced.

The effects of the present disclosure are not limited to the above-described effects. Although not described herein, other effects of the present disclosure can be clearly understood by a person having ordinary skill in the art from the following description.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
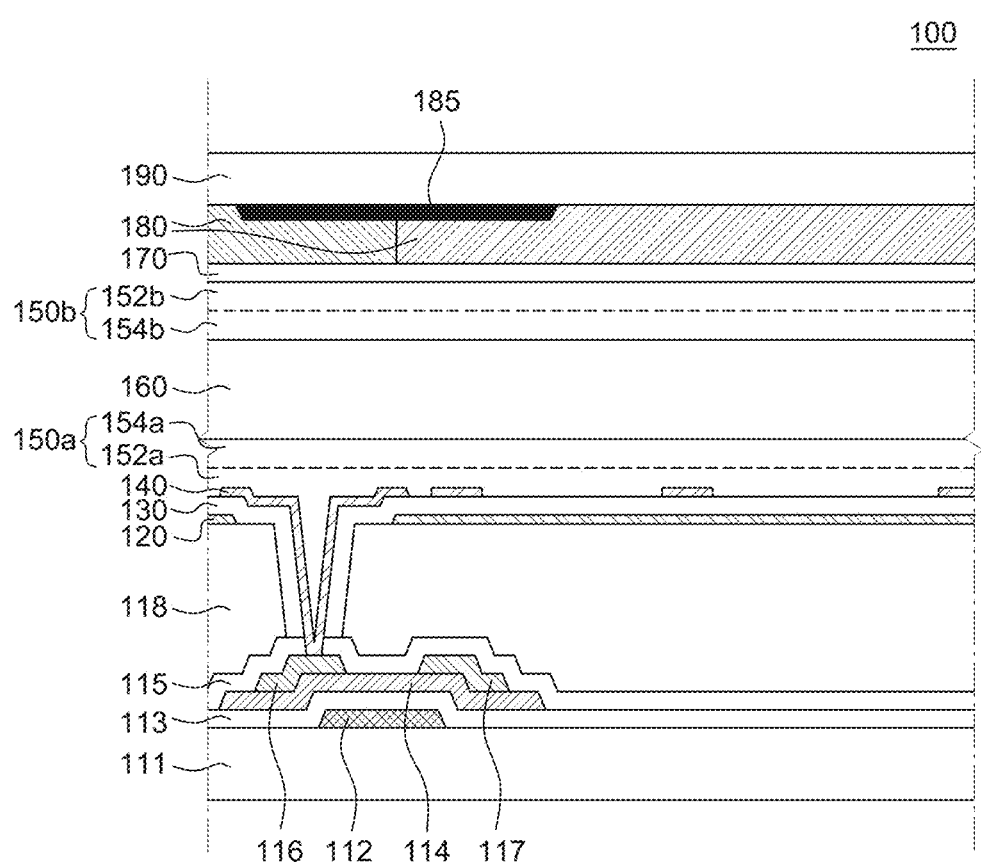
FIG. 1 is a cross-sectional view of a display device according to an exemplary embodiment of the present disclosure.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Same reference numerals generally denote same elements throughout the present specification. Further, in the following description, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When the time sequence between two or more incidents is described using the terms such as "after", "subsequent to", "next to", and "before", two or more incidents may be inconsecutive unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

The features of various embodiments of the present disclosure can be partially or entirely bonded to or combined with each other and can be interlocked and operated in technically various ways, and the embodiments can be carried out independently of or in association with each other.

Hereinafter, various exemplary embodiments of the present disclosure will be described in detail with reference to the accompanying drawings.

FIG. 1 is a cross-sectional view of a display device according to an exemplary embodiment of the present disclosure.

Referring to FIG. 1, a display device 100 includes gate lines and data lines on a substrate 111. A thin film transistor includes a gate electrode 112, an active layer 114, a source electrode 116, and a drain electrode 117. In detail, the gate electrode 112 is formed on the first substrate 111, and a gate insulation layer 113 is formed on the gate electrode 112. The active layer 114 is formed on the gate insulation layer 113. The source electrode 116 and the drain electrode 117 are electrically connected to the active layer 114.

And, although the thin film transistor is described as having an inverted staggered structure in the present disclosure, it is not limited thereto, and thin film transistors having various structures including a coplanar structure may be used.

And, FIG. 1 illustrates that a pixel electrode 140 is connected to the source electrode 116, assuming that the thin film transistor is an N-type thin film transistor. However, if the thin film transistor is a P-type thin film transistor, the pixel electrode 140 may be connected to the drain electrode 117.

And, the active layer 114 may be formed of amorphous silicon (a-Si), polycrystalline silicon (poly-Si), oxide semiconductor, organic semiconductor, or the like. If the active layer 114 is formed of oxide semiconductor, the oxide semiconductor may include ITO (indium tin oxide), IZO (indium zinc oxide), IGZO (indium gallium zinc oxide), or ITZO (indium tin zinc oxide), but is not limited thereto.

At least one protective film may be formed on the thin film transistor. That is, a first protective film 115 and a second protective film 118 are formed on the source electrode 116 and the drain electrode 117. The common electrode 120 is formed on the second protective film 118. The second protective film 118 may be formed of an organic material such as photoacryl and thus may improve an aperture ratio.

And, a third protective film 130 is formed to cover the common electrode 120. The pixel electrode 140 is formed on the third protective film 130. The pixel electrode 140 is in contact with the source electrode 116 through a contact hole of the second protective film 118. And, the first protective film 115 may be omitted.

In the present disclosure, an IPS mode display device and an FFS mode display device will be described taking an IPS mode display device as an example. In FIG. 1, the common electrode 142 is formed on the first substrate 111, but not formed on a second substrate 190. That is, the common electrode 120 is formed under the third protective film 130 and the pixel electrode 140 is formed on the third protective film 130. Otherwise, the pixel electrode 140 may be formed under the third protective film 130 and the common electrode 120 may be formed on the third protective film 130. And, the common electrode 120 may be disposed on the pixel electrode 140. The layout of the common electrode 120 and the pixel electrode 140 is not limited thereto, and the pixel electrode 140 may be disposed on the common electrode 120. Otherwise, the pixel electrode 140 may be formed on the same plane as the common electrode 120 rather than on different layers. For example, the common electrode 120 and the pixel electrode 140 may be disposed on the third protective film 130 or under the third protective film 130.

And, another electrode besides the pixel electrode 140 and the common electrode 120 may be formed under the common electrode 120 or the pixel electrode 140 to perform other functions, such as touch sensing or resistance drop, of the common electrode. Such an electrode may be disposed within the second protective film 118 formed of photoacryl.

And, the common electrode 120 and the pixel electrode 140 may be disposed in a straight shape. Otherwise, the common electrode 120 and the pixel electrode 140 may be disposed in a zig-zag shape having at least one a curved shape. And, at least one of a color filter and a black matrix 185 of the second substrate 190 may be formed into a straight shape or a zig-zag shape having at least one a curved shape. Further, the common electrode 120 or the pixel electrode 140 may be formed into a rectangular shape, or the common electrode 120 or the pixel electrode 140 may also be formed into a straight shape or a zig-zag shape having at least one a curved shape. Furthermore, the data line may be formed into a straight shape or a zig-zag shape having at least one a curved shape.

And, the first substrate 111 includes a first alignment film 150a, and the second substrate 190 which is a substrate facing the first substrate 111 includes a second alignment film 150b. The first alignment film 150a and the second alignment film 150b are layers configured to determine and maintain initial alignment of liquid crystal in a liquid crystal layer 160. The liquid crystal layer 160 is provided between the first substrate 111 and the second substrate 190 and formed between the first alignment film 150a and the second alignment film 150b.

The color filter 180 including red, green, and blue color filters may be formed under the second substrate 190. The black matrix 185 may be disposed under the second substrate 190. The black matrix 185 may be disposed between at least two of the red, green, and blue color filters 180 so as to suppress color mixing. An overcoating layer 170 may be disposed between the second alignment film 150b and the color filter 180.

In an exemplary embodiment of the present disclosure, each of the first alignment film 150a and the second alignment film 150b includes at least two alignment films. That is, the first alignment film 150a includes an upper alignment film 154a in contact with the liquid crystal layer 160 and a lower alignment film 152a spaced from the liquid crystal layer 160. Further, the second alignment film 150b includes an upper alignment film 154b in contact with the liquid crystal layer 160 and a lower alignment film 152b spaced from the liquid crystal layer 160. The upper alignment films 154a and 154b are in contact with the liquid crystal layer 160, but the lower alignment films 152a and 152b are not in contact with the liquid crystal layer 160.

If the IPS mode display device is applied to a display device of a mobile device, a variable driving mode in which a frequency of a signal applied to the display device is changed may be employed to reduce power consumption and increase a response speed in touch. When a frequency of a signal applied to the display device is changed, a flicker occurs, so that the user may recognize the flicker of the screen. Therefore, if the variable driving mode is employed, electric charges are generated according to a certain change of frequency and a switch of polarity. Thus, the electric charges are accumulated on an alignment film, resulting in the occurrence of image sticking or flicker. Further, if the variable driving mode is employed, DC discharge characteristics are not uniform at any frequency, and, thus, a flicker occurs. Therefore, to improve DC accumulation in an alignment film depending on a frequency in the variable driving mode, an alignment film with a high volume resistance is required.

And, in case of the IPS mode display device, DC image sticking occurs more often due to electric charges accumulated at an interface between the alignment film and a protective film in addition to the electric charges caused by a DC voltage and accumulated on the alignment film.

And, alignment of the liquid crystal included in the liquid crystal layer 160 is adjusted by an electric field generated by the common electrode 120 and the pixel electrode 140. The liquid crystal layer 160 is classified into a negative liquid crystal layer and a positive liquid crystal layer. The negative liquid crystal layer includes liquid crystal with negative (−) dielectric anisotropy (Δε=ε∥−ε⊥) and has a vertical dielectric constant higher than a horizontal dielectric constant. Further, the positive liquid crystal layer includes liquid crystal having positive (+) dielectric anisotropy and has a horizontal dielectric constant higher than a vertical dielectric constant.

In the liquid crystal layer with negative dielectric anisotropy, i.e., the negative liquid crystal layer, a director of the liquid crystal layer is aligned in a direction vertical to an electric field direction. Therefore, if an electric field is generated between the common electrode 120 and the pixel electrode 140, a director of a liquid crystal layer between the common electrode 120 and the pixel electrode 140 is aligned parallel to a horizontal plane of the first substrate 111 and the second substrate 190. Also, a director of a liquid crystal layer above the common electrode 120 and the pixel electrode 140 is aligned parallel to a horizontal plane of the first substrate 111 and the second substrate 190. Therefore, as compared with the positive liquid crystal layer, the negative liquid crystal layer is improved in light transmittance and thus exhibits relatively high brightness.

Although the transmittance may be improved by the liquid crystal layer with negative dielectric anisotropy, DC image sticking occurs. Therefore, to minimize or reduce the DC image sticking, an alignment film with a high volume resistance is required.

The inventors of the present disclosure conducted various experiments to analyze the causes of image sticking or flicker when an alignment film with a high volume resistance is employed to reduce DC image sticking, a variable driving mode is employed to reduce power consumption and increase a response speed in touch, and a liquid crystal layer having a negative dielectric constant is employed to improve the transmittance. As the causes, outgassing by a protective film, the thickness of an alignment film, film characteristics of the protective film, and the like were established. In detail, through the various experiments, it was found that the outgassing by the protective film does not affect the occurrence of image sticking or flicker. Herein, the outgassing refers to the phenomenon that if the protective film is formed of an organic film, a gas compound is discharged from the organic film and then reacts with ions included in the alignment film.

And, through the experiments, the inventors of the present disclosure found that the thickness of the alignment film has an insignificant effect on image sticking or flicker.

Therefore, the inventors of the present disclosure conducted an experiment for checking an effect of film characteristics of the protective film among the causes of image sticking or flicker. That is, the protective film was formed and then film characteristics of the protective film were analyzed. As the result of the analysis, it was found that the protective film has a silicon (Si) content higher than a nitrogen (N) content. Further, the silicon (Si) content and the nitrogen (N) content of the protective film are affected by a bonding ratio of silicon and nitrogen included in the protective film. The bonding ratio may be a bonding ratio (NH/SiH) of a nitrogen-hydrogen bond to a silicon-hydrogen bond included in the protective film. Therefore, the inventors of the present disclosure conducted an experiment for checking whether the volume resistance of the protective film is changed depending on the bonding ratio of silicon and nitrogen included in the protective film. Details thereof will be described with reference to FIG. 2.

The protective film is formed by chemical vapor deposition (CVD). The protective film is formed by reacting a deposition film with a gas decomposed into plasma by applying radio frequency power (RF power) in a vacuum and then removing the deposition film. If the protective film is formed of a silicon nitride film, a gas used herein may be silane ($SiH_4$), ammonia ($NH_3$), and the like.

Figure 2:
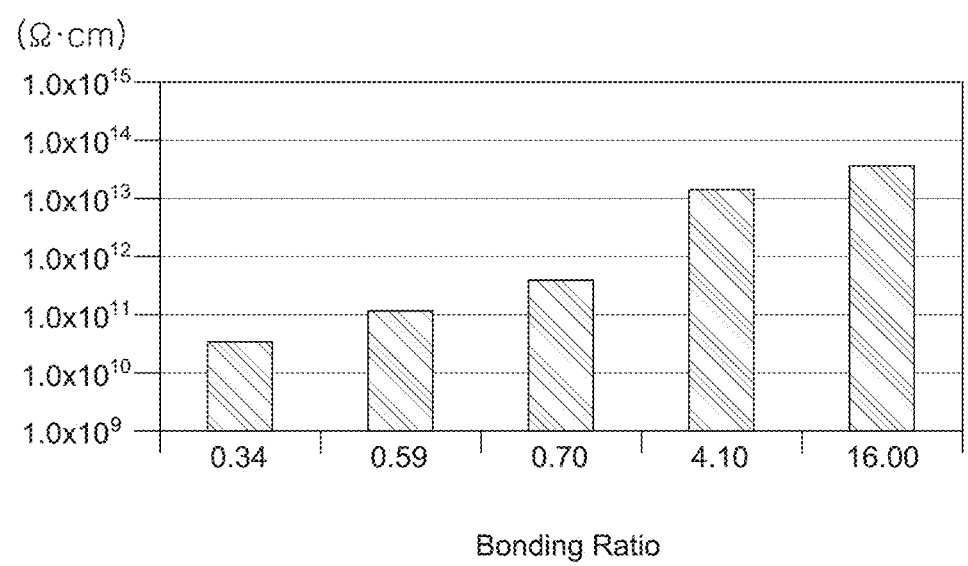
FIG. 2 illustrates a volume resistance according to a bonding ratio of a protective film according to an exemplary embodiment of the present disclosure.

FIG. 2 illustrates a volume resistance of a protective film according to a bonding ratio of the protective film according to an exemplary embodiment of the present disclosure.

In FIG. 2, the horizontal axis represents a bonding ratio of silicon (Si) and nitrogen (N) and the vertical axis represents a volume resistance (Ω·cm). And, when the bonding ratio of silicon (Si) and nitrogen (N) was 1 or less, the volume resistance of the protective film was measured at an applied voltage of 15 V. When the bonding ratio of silicon (Si) and nitrogen (N) was more than 1, the volume resistance of the protective film was measured at an applied voltage of 10 V. The volume resistance can be measured at each applied voltage, and if the volume resistance is high, it may be measured at different applied voltages, but the present disclosure is not limited thereto.

As illustrated in FIG. 2, if the bonding ratio of silicon (Si) and nitrogen (N) is 0.34, the volume resistance of the protective film is about $1.0 \times 10^{10}$ Ω·cm or more. Further, if the bonding ratio of silicon (Si) and nitrogen (N) is 0.59, the volume resistance of the protective film is about $1.0 \times 10^{11}$ Ω·cm. If the bonding ratio of silicon (Si) and nitrogen (N) is 0.70, the volume resistance of the protective film is about $1.0 \times 10^{12}$ Ω·cm or less. And, if the bonding ratio of silicon (Si) and nitrogen (N) is 4.10, the volume resistance of the protective film is about $1.0 \times 10^{13}$ Ω·cm or more. If the bonding ratio of silicon (Si) and nitrogen (N) is 16.00, the volume resistance of the protective film is about $1.0 \times 10^{13}$ Ω·cm or more. According to the result of the experiment, it can be seen that if the bonding ratio of silicon (Si) and nitrogen (N) is 1 or less, the volume resistance of the protective film is about $1.0 \times 10^{13}$ Ω·cm or less.

Therefore, it can be seen that the volume resistance when the bonding ratio of silicon (Si) and nitrogen (N) is 1 or less is lower than the volume resistance when the bonding ratio of silicon (Si) and nitrogen (N) is more than 1. That is, it can be seen that when the protective film has a silicon (Si) content higher than a nitrogen (N) content, the volume resistance of the protective film is decreased. Further, it can be seen that when the bonding ratio of silicon (Si) and nitrogen (N) is 1 or less, a silicon (Si) content is higher than a nitrogen (N) content. Therefore, it can be seen that DC discharge occurs when the bonding ratio of silicon (Si) and nitrogen (N) is 1 or less as compared with the case where the bonding ratio of silicon (Si) and nitrogen (N) is more than 1.

Accordingly, as the volume resistance of the protective film is decreased, DC discharge is more likely to occur. Therefore, it can be seen that the occurrence of image sticking or flicker can be reduced. That is, if the variable driving mode and the liquid crystal layer with a negative dielectric constant are employed, an alignment film with a high volume resistance is required to minimize or reduce image sticking or flicker. It can be seen that if the alignment film with a high volume resistance is employed, the protective films may have a lower volume resistance than the alignment film to minimize or reduce image sticking or flicker.

As illustrated in FIG. 2, it can be seen that when the protective film has a silicon (Si) content higher than a nitrogen (N) content, the volume resistance of the protective film is decreased. Further, the silicon (Si) content and the nitrogen (N) content of the protective film may be affected by the conditions for forming the protective film. For example, the silicon (Si) content and the nitrogen (N) content may be affected by the flow rate of silane ($SiH_4$), the flow rate ratio of silane($SiH_4$) to ammonia ($NH_3$), the thickness of the protective film, the RF power at the time of forming the protective film, and the like.

Hereinafter, the result of measuring image sticking depending on the bonding ratio of silicon and nitrogen included in the protective film will be described with reference to Table 1.

TABLE 1

| | A:B | Bonding ratio | Image sticking (1 hr) | Image sticking (6 hrs) |
|---|---|---|---|---|
| Comparative Example 1 | 1:10 | 4.10 | 3/5 | 5/5 |
| Comparative Example 2 | 1:10 | 2.09 | 1/6 | 6/6 |
| Example 1 | 1:10 | 0.95 | 0/6 | 6/6 |
| Example 2 | 1:4 | 0.34 | 0/4 | 0/4 |
| Example 3 | 1:4 | 0.34 | 0/6 | 2/6 |

In Table 1, A:B represents the flow rate ratio of $SiH_4$ to $NH_3$ and Bonding Ratio represents the bonding ratio of silicon and nitrogen. Further, Image Sticking (1 hr) represents the result of measuring image sticking after 1 hour and Image Sticking (6 hrs) represents the result of measuring image sticking after 6 hours. Image sticking evaluation is performed by measuring the time required for disappearance of image sticking when a fixed pattern is switched to a gray pattern for 1 hour or 6 hours. For example, in the evaluation of image sticking after 1 hour, when the fixed pattern is switched to the gray pattern, if the fixed pattern remains for 1 hour, it is determined that image sticking appears. If the fixed pattern disappears, it is determined that image sticking disappears. Further, a case where image sticking disappears after 1 hour may be determined as a high-quality product or a case where image sticking disappears after 1 hour and after 6 hours may be determined as a high-quality product. Such determination depends on the demands of consumers, and the criteria for high-quality product are not limited thereto.

In Comparative Example 1, Comparative Example 2, and Example 2, an active layer constituting a thin film transistor is formed of amorphous silicon. In Example 1 and Example 3, an active layer constituting a thin film transistor is formed as an oxide semiconductor layer. The oxide semiconductor layer may be formed of ITO (Indium Tin Oxide), IZO (Indium Zinc Oxide), IGZO (Indium Gallium Zinc Oxide), ITZO (Indium Tin Zinc Oxide), or the like, but is not limited thereto.

In Comparative Example 1 and Comparative Example 2, image sticking is measured when the flow rate ratio of $SiH_4$ to $NH_3$ is 1:10 at different bonding ratios of silicon and nitrogen. As listed in Table 1, as the result of measuring image sticking after 1 hour when the bonding ratio of silicon and nitrogen is 4.10, image sticking appears in three out of five samples. Further, as the result of measuring image sticking after 6 hours, image sticking appears in five out of five samples. Also, as the result of measuring image sticking after 1 hour when the bonding ratio of silicon and nitrogen is 2.09, image sticking appears in one out of six samples. Further, as the result of measuring image sticking after 6 hours, image sticking appears in six out of six samples. Therefore, it can be seen that image sticking after 1 hour is decreased in Comparative Example 2 where the bonding ratio of silicon and nitrogen is low as compared with Comparative Example 1.

Further, in Example 1, image sticking is measured when the flow rate ratio of $SiH_4$ to $NH_3$ is 1:10 in the same manner as Comparative Examples 1 and 2 and the bonding ratio of silicon and nitrogen is 0.95. In Example 1 where the bonding ratio of silicon and nitrogen is 1 or less as compared with Comparative Examples 1 and 2, image sticking does not appear after 1 hour but image sticking appears after 6 hours. Therefore, it can be seen that when the bonding ratio of silicon and nitrogen is 1 or less, image sticking disappears after 1 hour, so that the bonding ratio of silicon and nitrogen affects image sticking.

In Example 2, image sticking is measured when the flow rate ratio of $SiH_4$ to $NH_3$ is 1:4 and the bonding ratio of silicon and nitrogen is 0.34. It can be seen that image sticking does not appear after 1 hour and after 6 hours when the flow rate ratio of $SiH_4$ to $NH_3$ and the bonding ratio of silicon and nitrogen are decreased as compared with Example 1. Therefore, it can be seen that when the bonding ratio of silicon and nitrogen is 1 or less, image sticking disappears after 1 hour and 6 hours, so that the bonding ratio of silicon and nitrogen affects image sticking. Further, it can be seen that the flow rate ratio of $SiH_4$ to $NH_3$ also affects image sticking.

Example 3 is the same as Example 2 except that the active layer of Example 3 is formed of oxide semiconductor and the active layer of Example 2 is formed of amorphous silicon. According to the result of the experiment, it can be seen that image sticking does not appear after 1 hour but image sticking slightly appears after 6 hours. Therefore, it can be seen that when the bonding ratio of silicon and nitrogen is 1 or less, image sticking disappears after 1 hour and image sticking is reduced after 6 hours, so that the bonding ratio of silicon and nitrogen affects image sticking. Further, the kind of an active layer of a thin film transistor has an insignificant effect on image sticking.

Accordingly, it can be seen that when the bonding ratio of silicon and nitrogen is 1 or less, image sticking of the display device is improved. Further, it can be seen that when the bonding ratio of silicon and nitrogen is 1 or less, the protective film has a silicon content higher than a nitrogen content.

Hereinafter, the alignment film will be described with reference to FIG. 1. A photo-alignment film can be classified into photo-isomerization, photo-dimerization, and photo-degradation alignment films. The photo-isomerization alignment film can be classified into two types. One is an alignment film configured to control a direction of a liquid crystal layer by mixing reactive molecules with a polymer to form a polyimide film and irradiating a polarized light thereto. The other one is an alignment film configured to generate optical anisotropy by irradiating a linearly polarized light to a polymer film including photoisomerized molecules at a side chain or an end group to photoisomerize only a molecule heading toward a specific direction. And, the photo-dimerization alignment film is configured to generate optical anisotropy by irradiating a linearly polarized light to a polymer film exhibiting a photo-dimerization reaction to react a molecule in a specific direction. And, the photo-degradation alignment film is configured to generate optical anisotropy through a photo-degradation reaction in which a linearly polarized UV light is irradiated to a polymer film to selectively cleave a molecular bond in a specific direction.

Herein, the photo-degradation alignment film will be described as an example. However, the present disclosure is not limited thereto, and the exemplary embodiment of the present disclosure can be applied to any alignment film with a high volume resistivity.

If the first alignment film 150a and the second alignment film 150b have a low molecular weight, switching of the liquid crystal layer 160 may be easily carried out. Therefore, if the first alignment film 150a and the second alignment film 150b include at least two layers, the alignment stability can be improved. However, when a light is irradiated to the upper alignment films 154a and 154b, the lower alignment films 152a and 152b are also photo-degraded, so that light leakage may be caused by AC image sticking during display having a black screen. Therefore, to improve the alignment stability of the first alignment film 150a and the second alignment film 150b, the upper alignment films 154a and 154b with a low molecular weight are formed adjacent to the liquid crystal layer 160 and the lower alignment films 152a and 152b with a high molecular weight are formed thereunder, respectively. Thus, even if the liquid crystal layer 160 is switched, the lower alignment films 152a and 152b are difficult to move. Therefore, it is possible to control the movement of the upper alignment films 154a and 154b. Accordingly, AC image sticking can be improved, so that light leakage during display having a black screen can be minimized or reduced. And, the upper alignment films 154a and 154b are formed of a material including a photo-degradable material and the lower alignment films 152a and 152b are formed of a material without a photo-degradable material. Thus, a photo-degradation reaction does not occur in the lower alignment films 152a and 152b during light irradiation, so that the first alignment film 150a and the second alignment film 150b are not decreased in molecular weight. Herein, the AC image sticking refers to the phenomenon that if the display device is driven by applying an alternating current (AC) voltage, the liquid crystal layer does not return to its initial alignment state when the voltage is off.

Therefore, the first alignment film 150a and the second alignment film 150b have a molecular weight in the range of, for example, 10,000 to 15,000. Herein, the molecular weight may refer to a weight-average molecular weight. The weight-average molecular weight may be an average molecular weight of a polymer material.

And, the upper alignment films 154a and 154b are formed of a material including a photo-degradable material and the lower alignment films 152a and 152b are formed of a material without a photo-degradable material. Therefore, the lower alignment films 152a and 152b without a photo-degradable material, for example, cyclobutane, has a lower volume resistance than the upper alignment films 154a and 154b. For example, the upper alignment films 154a and 154b has a volume resistance of about $1.0 \times 10^{15}$ Ω·cm or more and lower surfaces of the lower alignment films 152a and 152b have a volume resistance of about $1.0 \times 10^{13-14}$ Ω·cm. The lower alignment films 152a and 152b having a lower volume resistance than the upper alignment films 154a and 154b may discharge electric charges accumulated on the first alignment film 150a and the second alignment film 150b and/or minimize or reduce accumulation of electric charges supplied from the outside on the first alignment film 150a and the second alignment film 150b. Therefore, since the lower alignment films 152a and 152b can quickly discharge the accumulated electric charges, DC image sticking of the display device 100 can be minimized or reduced.

And, if the variable driving mode is employed, the upper alignment films 154a and 154b and the lower alignment films 152a and 152b may have the same volume resistance. Thus, the upper alignment films 154a and 154b impart anisotropy so as to improve the alignment power and the lower alignment films 152a and 152b make DC discharge characteristics uniform at any frequency. Therefore, image sticking or flicker can be improved. Furthermore, the upper alignment films 154a and 154b and the lower alignment films 152a and 152b may have a volume resistance of, for example, about $1.0 \times 10^{13}$ Ω·cm to about $1.0 \times 10^{15}$ Ω·cm.

Hereinafter, the variable driving mode will be explained.

The display device 100 includes a plurality of gate lines and a plurality of data lines. The display device 100 may include a plurality of pixels at intersections between the plurality of gate lines and/or the plurality of data lines. A driving circuit of the display device 100 writes data of an input image to the pixels. The driving circuit includes a gate driver and a data driver which are driven under the control of a timing controller. The gate driver supplies a gate voltage to each of the plurality of pixels through the plurality of gate lines connected to the gate driver. The gate driver may be implemented as a GIP (Gate drive is In Panel) circuit mounted on one side of the display device 100. Further, the data driver supplies a data voltage to each of the plurality of pixels connected to the plurality of data lines.

The timing controller receives digital video data of the input image and timing signals synchronized with the digital video data from a system board. The timing signals may include a vertical sync signal (Vsync), a horizontal sync signal (Hsync), a clock signal (DCLK), and a data enable signal (DE).

Further, the timing controller includes a variable driving controller configured to adjust a driving frequency for the driving circuit of the display device. The variable driving controller may be included in the gate driver. That is, the variable driving controller distinguishes a still image and a moving image and outputs a frequency corresponding to the still image or the moving image.

The variable driving mode may be referred to as VRR (Variable Refresh Rate) or LRR (Low Refresh Rate) driving mode. The variable driving mode may be referred to as a dual variable driving mode since the display device is driven at a frequency of from 30 Hz to 60 Hz or from 60 Hz to 30 Hz. That is, a still image may be implemented at 30 Hz and a moving image may be implemented at 60 Hz. Otherwise, a still image may be implemented at 60 Hz and a moving image may be implemented at 30 Hz.

And, in the variable driving mode, the display device is driven at a frequency of from 24 Hz to 120 Hz, for example, 24 Hz, 30 Hz, 48 Hz, 60 Hz, 80 Hz, and 120 Hz. Therefore, the variable driving mode may be referred to as a random variable driving mode. That is, a still image and a moving image can be implemented in the above-described frequency range. For example, the still image may be implemented at 24 Hz and the moving image may be implemented at one or more frequencies of 30 Hz, 48 Hz, 60 Hz, 80 Hz, and 120 Hz. However, the frequencies for the variable driving mode may be changed and may not be limited thereto.

And, the variable driving mode may be implemented such that a voltage with at least two frequencies can be applied from the timing controller to the pixel electrode 140 or the common electrode 120. Therefore, the frequency can be decreased when a still image is implemented in the variable driving mode. Thus, power consumption can be reduced. And, the frequency can be increased when a moving image is implemented. Thus, response speed in a touch can be increased.

The first alignment film 150a and the second alignment film 150b including the upper alignment films 154a and 154b and the lower alignment films 152a and 152b may be formed of a precursor mixture including a first precursor and a second precursor having different weight-average molecular weights. A difference in molecular weight between the first precursor and the second precursor may facilitate the formation of the upper alignment films 154a and 154b and the lower alignment films 152a and 152b of the first alignment film 150a and the second alignment film 150b. And, since the precursor mixture is applied, polyimide with a high weight-average molecular weight can be provided.

The first precursor in the precursor mixture may be formed of a polyimide. Imidization of the polyimide can be classified into thermal imidization in which a polyamic acid solution is intactly heated and chemical imidization in which a catalyst is added to a polyamic acid solution. In the thermal imidization, it is difficult to form an alignment film having a sufficient molecular weight. And, in the chemical imidization, it is difficult to remove the solution after the end of the imidization reaction. Therefore, in an exemplary embodiment of the present disclosure, a soluble polyimide which is a previously imidized material may be employed as the first precursor of the precursor mixture. Thus, it is possible to minimize or reduce a decrease in molecular weight caused by thermal imidization and also possible to solve the difficulty in removing a solution after an imidization reaction caused by chemical imidization.

Solubility of the polyimide may be achieved by applying a material such as polyimide to the previously imidized precursor mixture for forming the alignment films 150a and 150b. And, polyimide included in the precursor mixture may be dissolved in a solvent used for forming the alignment films 150a and 150b of the display device. For example, polyimide in the precursor mixture may have a high solubility in NMP (N-Methyl-2-Pyrrolidone), BCS (Butyl CelloSolve), and a solvent in which NMP and BCS are mixed.

Therefore, the first precursor in the precursor mixture may be a soluble polyimide. The soluble polyimide may include polyimide including a photo-degradable material. A molecular formula of polyimide including a photo-degradable material may be represented by Chemical Formula 1.

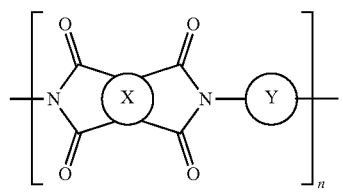

[Chemical Formula 1]

In Chemical Formula 1, n is a natural number, X is a photo-degradable material sensitive to UV irradiation, and Y is an aromatic hydrocarbon group with two or more rings.

The photo-degradable material may be cyclobutane having a structure as shown below.

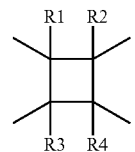

Herein, each of R1, R2, R3, and R4 represents one or more members among a hydrogen atom, a fluorine atom, a chlorine atom, a bromine atom, a phenyl group, an alkyl group having 1 to 6 carbon atoms, an alkoxy group having 1 to 6 carbon atoms, a vinyl group (—($CH_2$)mCH=$CH_2$, m=0 to 2), and an acetyl group (—($CH_2$)m-C=CH, m=0 to 2).

The aromatic hydrocarbon group may have a structure as shown below.

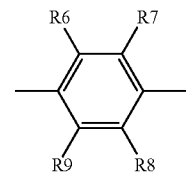

Herein, each of R6, R7, R8, and R9 represents one or more members among a hydrogen atom, a fluorine atom, a chlorine atom, a bromine atom, a phenyl group, an alkyl group having 1 to 6 carbon atoms, an alkoxy group having 1 to 6 carbon atoms, a vinyl group (—($CH_2$)mCH=$CH_2$, m=0 to 2), and an acetyl group (—($CH_2$)m-C=CH, m=0 to 2).

Polyimide in Chemical Formula 1 has a high solubility in NMP (N-Methyl-2-Pyrrolidone), BCS (Butyl CelloSolve), and a mixed solvent with NMP and BCS. If Y includes an aromatic hydrocarbon group with one ring, polyimide may not have a sufficient solubility to be used in the precursor mixture. Therefore, if Y includes an aromatic hydrocarbon group with two or more rings, the solubility between polyimide can be increased, so that polyimide can be present in a liquid form at room temperature.

The soluble polyimide may further include polyamic acid including a photo-degradable material. Therefore, the soluble polyimide including a photo-degradable material may be a combination of polyimide including a photo-degradable material and polyamic acid including a photo-degradable material.

The second precursor in the precursor mixture may include at least one of a polyamic acid and a polyamic acid ester without a photo-degradable material and may be represented by Chemical Formula 2.

[Chemical Formula 2]

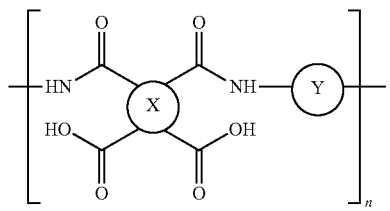

In Chemical Formula 2, X is an aromatic hydrocarbon group with two or more rings and Y is an aromatic hydrocarbon group with one or more rings.

The aromatic hydrocarbon group may have a structure as shown below.

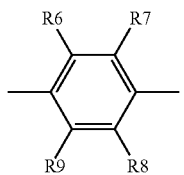

In Chemical Formula 2, each of R6, R7, R8, and R9 represents one or more members of the group having a hydrogen atom, a fluorine atom, a chlorine atom, a bromine atom, a phenyl group, an alkyl group having 1 to 6 carbon atoms, an alkoxy group having 1 to 6 carbon atoms, a vinyl group ($-(CH_2)mCH=CH_2$, m=0 to 2), and an acetyl group ($-(CH_2)m-C\equiv CH$, m=0 to 2).

Therefore, according to the exemplary embodiments of the present disclosure, it can be seen that an alignment film may have a high volume resistance and a protective film adjacent to the alignment film may have a low volume resistance to minimize or reduce image sticking or flicker caused by electric charges accumulated at the interface between the alignment film and the protective film. Further, it can be seen that the alignment film with a high volume resistance may be formed and if the variable driving mode is employed, the protective film adjacent to the alignment film may have a low volume resistance to minimize or reduce image sticking or flicker. That is, to reduce a volume resistance of the third protective film 130 as a protective film adjacent to the first alignment film 150a, the third protective film 130 may have a silicon content higher than a nitrogen content. If the third protective film 130 has a silicon content higher than a nitrogen content, a bonding ratio of silicon and nitrogen in the third protective film 130 may be 1 or less.

Hereinafter, a method for manufacturing a display device according to an exemplary embodiment of the present disclosure will be described with reference to FIG. 3.

Figure 3:
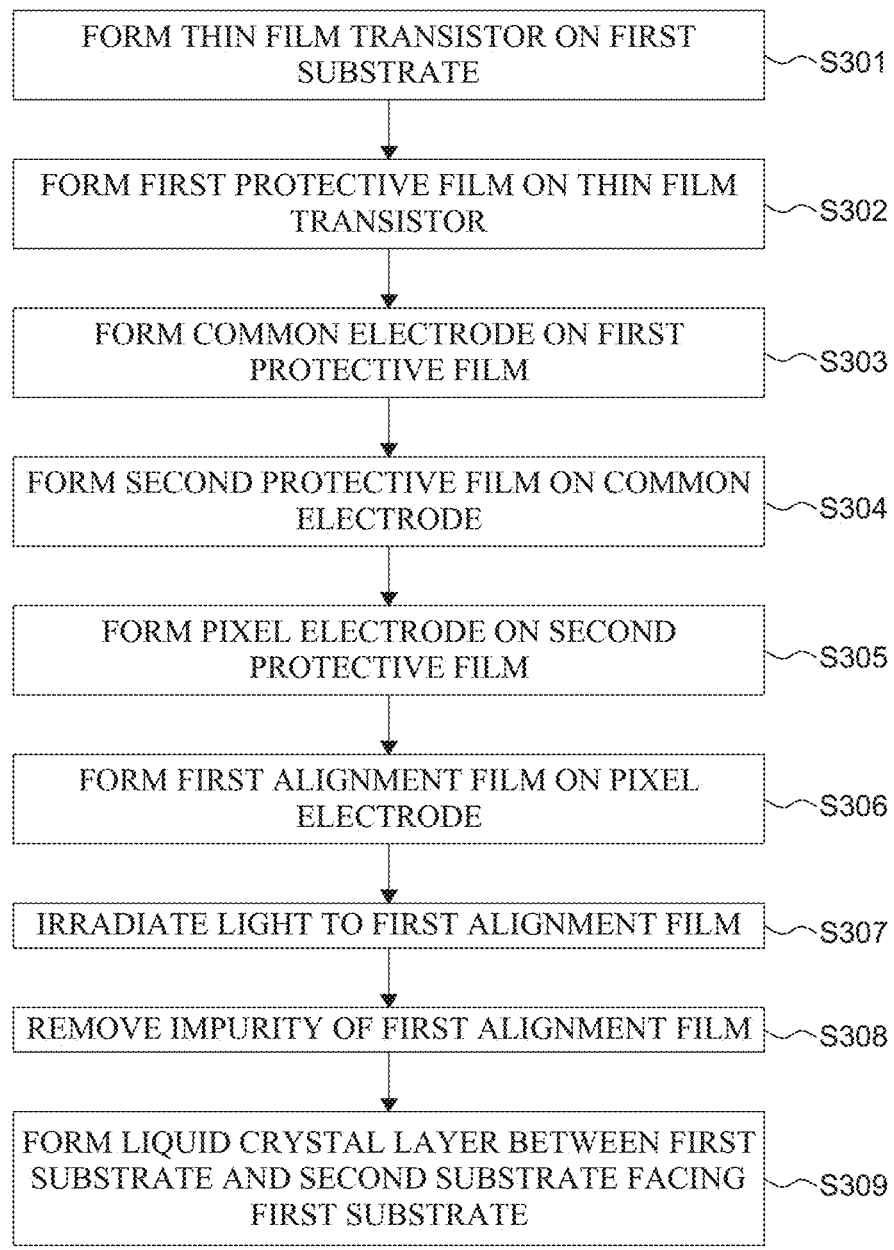
FIG. 3 is a flowchart provided to explain a method for manufacturing a display device according to an exemplary embodiment of the present disclosure.

FIG. 3 is a flowchart provided to explain a method for manufacturing a display device according to an exemplary embodiment of the present disclosure.

A method for manufacturing a display device will be described with reference to FIG. 1 through FIG. 3. Firstly, a thin film transistor is formed on the first substrate 111 (S301). The thin film transistor includes the gate electrode 112, the active layer 114, the source electrode 116, and the drain electrode 117. In detail, the gate electrode 112 is formed on the first substrate 111, and the gate insulation layer 113 is formed on the gate electrode 112. The active layer 114 is formed on the gate insulation layer 113. The source electrode 116 and the drain electrode 117 are electrically connected to the active layer 114.

Then, a first protective film is formed on the thin film transistor (S302). Then, the common electrode 120 is formed on the first protective film (S303). The second protective film may be formed on the common electrode 120 (S304). Then, the pixel electrode 140 is formed on the second protective film (S305).

The first alignment film 150a is formed on the pixel electrode 140 (S306). The first alignment film 150a is formed by coating a precursor mixture including soluble polyimide including a photo-degradable material and at least one of polyamic acid and polyamic acid ester without a photo-degradable material. The soluble polyimide and polyamic acid will be described. Firstly, the soluble polyimide including a photo-degradable material and the polyamic acid without a photo-degradable material are mixed in a single layer. After a predetermined period of time, for example, about 100 to 150 seconds, the polyamic acid without a photo-degradable material has a higher weight-average molecular weight than the soluble polyimide and thus goes under the soluble polyimide. Thus, a precursor structure including a plurality of layers is formed. Then, a curing process of heating the precursor structure including a plurality of layers is performed to cause an imidization reaction for forming an alignment film including a plurality of layers. The curing process may be performed at a temperature of 200° C. to 250° C. for 1800 seconds to 2500 seconds. In detail, the curing process may be performed at a temperature of 230° C. for 2000 seconds, but is not limited thereto. Further, a process of drying the alignment film may be further performed before the curing process. The drying process may be performed at a temperature of 150° C. to 180° C. for 100 seconds to 200 seconds. In detail, the drying process may be performed at a temperature of 160° C. for 150 seconds, but is not limited thereto.

Then, a light is irradiated to the first alignment film 150a (S307). A polarized UV light may have a wavelength of about 200 nm to about 300 nm and preferably 230 nm to 250 nm. And, UV exposure energy may be in the range of 200 mJ to 600 mJ.

If the light is irradiated, a main chain of polyimide in the first alignment film 150a including a plurality of layers is cleaved by the polarized UV light. The main chain of polyimide aligned in a direction vertical to a polarized direction remains and the first alignment film 150a including a plurality of layers has anisotropy. A cleaved byproduct of the main chain of polyimide is removed during a process of removing a degradation product of the first alignment film 150a (S308). The cleaved byproduct of the main chain of polyimide may be impurities that inhibit alignment of liquid crystal molecules included in the liquid crystal layer 160. For example, the cleaved byproduct of the main chain of polyimide may be maleimide.

The process of removing the degradation product of the first alignment film 150a may include at least two processes. In a first degradation product removal process among the two processes, a cleaved byproduct with a relatively high molecular weight and a cleaved byproduct with a medium or low molecular weight are removed from a surface of the first alignment film 150a with a lactate-based organic solution. Byproducts generated from a photo-degradable material, for example, cyclobutane may be removed through the first degradation product removal process. The lactate-based organic solution is effective in removing a cleaved byproduct with a high molecular weight (for example, more than 10,000 Da). Therefore, the first degradation product removal process may be performed using the lactate-based organic solution.

In more detail, the lactate-based organic solution temporarily swells the surface of the first alignment film 150a and increases the roughness of the first alignment film 150a. Polyimide in the first alignment film 150a is not dissolved by the lactate-based organic solution, but is swollen only by the lactate-based organic solution inserted between chains of polyimide. Thus, the byproduct with a high molecular weight on the surface of the first alignment film 150a can be easily removed.

Herein, the lactate-based organic solution may include at least one of methyl lactate, ethyl lactate, n-propyl lactate, or n-butyl lactate. Further, the lactate-based organic solution may be mixed with deionized water (DI). The ethyl lactate as one of the lactate-based organic solution has a lower volatility than methyl lactate and a lower molecular weight than n-propyl lactate or n-butyl lactate.

And, after the first impurity removal process, a curing process which is a second degradation product removal process among the at least two processes is performed. In the second impurity removal process which is a curing process, the cleaved products most of which have a low molecular weight and which remain on the first alignment film 150a are evaporated. Further, the degraded byproducts generated from the photo-decomposable material, for example, cyclobutane are removed from the first alignment film 150a. Furthermore, the surface of the first alignment film 150a is re-organized through a heat treatment which is a curing process. The curing process may be performed at a temperature of 200° C. to 250° C. for 1000 seconds to 4000 seconds. In detail, the curing process may be performed at a temperature of 230° C. for 1200 seconds, but is not limited thereto.

Therefore, through the curing process as the first impurity removal process using the lactate-based organic solution and the curing process as the second impurity removal process, the photo-degradable material, the cleaved byproducts with a low molecular weight, and the cleaved byproducts with a high molecular weight can be removed from the first alignment film 150a.

And, the degradation product of the alignment film during light irradiation may be removed through the curing process as the first impurity removal process and the curing process as the second impurity removal process, or only through the curing process. In this case, a time required for the curing process may be increased. That is, the curing process may be performed at a temperature of 230° C. for 3600 seconds. Therefore, the impurities of the alignment film may be removed through at least one of the process of cleaning the alignment film and the process of curing the alignment film.

Then, the color filter 180 may be formed on the second substrate 190. The black matrix 185 may be formed on the second substrate 190 and the color filter 180 may be formed on the second substrate 190. The overcoating layer 170 may be formed between the second alignment film 150b and the color filter 180. The second alignment film 150b may be formed through the same process as the first alignment film 150a. Therefore, a detailed explanation thereof will be omitted.

Then, the liquid crystal layer 160 is formed between the first substrate 111 and the second substrate 190 facing the first substrate 111 (S309). The liquid crystal layer 160 is formed as a liquid crystal layer with negative dielectric anisotropy, so that the transmittance can be improved.

The exemplary embodiments of the present disclosure can also be described as follows:

According to an exemplary embodiment of the present disclosure, a display device comprises a thin film transistor on a substrate, a protective film on the thin film transistor, and an alignment film on the protective film. The protective film includes one or more protective films, and a protective film adjacent to the alignment film among the one or more protective films has a silicon content higher than a nitrogen content.

According to one or more embodiments of the present disclosure, a bonding ratio of silicon and nitrogen in the protective film adjacent to the alignment film may be 1 or less.

According to one or more embodiments of the present disclosure, the protective film adjacent to the alignment film may have a lower volume resistance than a volume resistance of the alignment film.

According to one or more embodiments of the present disclosure, the alignment film may include an upper alignment film including a photo-degradable material and a lower alignment film without a photo-degradable material.

According to one or more embodiments of the present disclosure, the upper alignment film may include a soluble polyimide, and the lower alignment film may include at least one of a polyamic acid and a polyamic acid ester.

According to one or more embodiments of the present disclosure, the display device may further include a second substrate facing the substrate, and a liquid crystal layer between the substrate and the second substrate. The upper alignment film may be more adjacent to the liquid crystal layer than the lower alignment film.

According to one or more embodiments of the present disclosure, the alignment film includes an upper alignment film and a lower alignment film, and at least one of the upper alignment film and the lower alignment film may have a volume resistance of $1.0 \times 10^{15}$ Ω·cm or less.

According to one or more embodiments of the present disclosure, the display device may further include a common electrode under the protective film, a pixel electrode on the protective film, a second substrate facing the substrate, and a liquid crystal layer disposed between the substrate and the second substrate and having negative dielectric anisotropy.

According to one or more embodiments of the present disclosure, the pixel electrode or the common electrode may be configured to be provided with a voltage with at least two frequencies.

According to one or more embodiments of the present disclosure, the thin film transistor may include an active layer formed of amorphous silicon.

According to one or more embodiments of the present disclosure, the upper alignment film may have a lower molecular weight than the lower alignment film.

According to another exemplary embodiment of the present disclosure, a display device comprises a pixel electrode and a common electrode on at least one of a first substrate and a second substrate, a first alignment film and a second alignment film on the first substrate and the second substrate, respectively, a liquid crystal layer between the first substrate and the second substrate, the liquid crystal layer having negative dielectric anisotropy, and a protective film adjacent to the liquid crystal layer and having a lower volume resistance than a volume resistance of the first alignment film.

According to one or more embodiments of the present disclosure, the protective film may have a volume resistance of $1.0\times10^{13}$ Ω·cm or less, and the first alignment film may have a volume resistance of $1.0\times10^{15}$ Ω·cm or less.

According to one or more embodiments of the present disclosure, the protective film may be formed of silicon nitride and may have a silicon content higher than a nitrogen content.

According to one or more embodiments of the present disclosure, the protective film may be formed of a silicon nitride and a bonding ratio of silicon and nitrogen in the protective film may be 1 or less.

According to one or more embodiments of the present disclosure, at least one of the first alignment film and the second alignment film may include an upper alignment film including a photo-degradable material and a lower alignment film without a photo-degradable material. The upper alignment film may be more adjacent to the liquid crystal layer than the lower alignment film.

According to one or more embodiments of the present disclosure, the upper alignment film may include a soluble polyimide, and the lower alignment film may include at least one of a polyamic acid and a polyamic acid ester.

According to one or more embodiments of the present disclosure, the pixel electrode or the common electrode may be configured to be provided with a voltage with at least two frequencies.

According to one or more embodiments of the present disclosure, the first alignment film and the second alignment film may be formed of a precursor mixture including a first precursor and a second precursor having different weight-average molecular weights, respectively.

According to one or more embodiments of the present disclosure, the first precursor may include a soluble polyimide, and the second precursor may include at least one of a polyamic acid and a polyamic acid ester without a photo-degradable material.

According to one or more embodiments of the present disclosure, the upper alignment film may have a lower molecular weight than the lower alignment film.

According to another exemplary embodiment of the present disclosure, a method for manufacturing a display device comprises forming a thin film transistor on a first substrate, forming a protective film on the thin film transistor, forming an alignment film on the protective film, irradiating a light to the alignment film, removing an impurity or a degradation product of the alignment film, and forming a liquid crystal layer between the first substrate and a second substrate facing the first substrate. The protective film adjacent to the liquid crystal layer is formed to have a lower volume resistance than a volume resistance of the alignment film.

According to one or more embodiments of the present disclosure, the protective film may have a volume resistance of $1.0\times10^{13}$ Ω·cm or less, and the alignment film may have a volume resistance of $1.0\times10^{15}$ Ω·cm or less.

According to one or more embodiments of the present disclosure, the protective film may be formed of a silicon nitride and may have a silicon content higher than a nitrogen content.

According to one or more embodiments of the present disclosure, the protective film may be formed of a silicon nitride and a bonding ratio of silicon and nitrogen in the protective film may be 1 or less.

According to one or more embodiments of the present disclosure, the alignment film may include an upper alignment film including a photo-degradable material and a lower alignment film without a photo-degradable material.

According to one or more embodiments of the present disclosure, the upper alignment film may include a soluble polyimide, and the lower alignment film may include at least one of a polyamic acid and a polyamic acid ester.

According to one or more embodiments of the present disclosure, the removing of the degradation product of the alignment film may include at least one of a cleaning the alignment film and a curing the alignment film.

According to one or more embodiments of the present disclosure, the method may further include forming a pixel electrode and a common electrode on the thin film transistor before forming the alignment film on the protective film.

According to one or more embodiments of the present disclosure, the pixel electrode or the common electrode may be configured to be provided with a voltage with at least two frequencies.

According to one or more embodiments of the present disclosure, the thin film transistor may include an active layer formed of amorphous silicon.

According to one or more embodiments of the present disclosure, the upper alignment film may have a lower molecular weight than the lower alignment film.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A method for manufacturing a display device, the method comprising:
    forming a thin film transistor having a gate electrode, an active layer, a source electrode, and a drain electrode on a first substrate;
    forming a first protective film on the thin film transistor, wherein the first protective film is formed of an organic material;
    forming a common electrode on the first protective film;
    forming a second protective film on the first protective film;
    forming a pixel electrode on the second protective film, the second protective film and the pixel electrode contacting the thin film transistor through a contact hole formed in the first protective film;
    forming an alignment film on the second protective film, wherein the alignment film includes an upper alignment film including a photo-degradable material and a lower alignment film without a photo-degradable material,
    wherein the lower alignment film having a flat upper surface completely fills the contact hole, and a thickness of the lower alignment film in the contact hole is greater than that of the lower alignment film in other regions,
    wherein the contact hole is disposed over the active layer to overlap the active layer, and
    wherein an edge of the active layer is protruded from edges of the source and drain electrodes;
    irradiating a light to the alignment film;
    removing an impurity or a degradation product of the alignment film; and
    forming a liquid crystal layer between the first substrate and a second substrate facing the first substrate,
    wherein the second protective film adjacent to the liquid crystal layer has a lower volume resistance than a volume resistance of the alignment film.

2. The method for manufacturing a display device according to claim 1, wherein the second protective film has a volume resistance of $1.0 \times 10^{13}$ Ω·cm or less, and the alignment film has a volume resistance of $1.0 \times 10^{15}$ Ω·cm or less.

3. The method for manufacturing a display device according to claim 1, wherein the second protective film is formed of a silicon nitride and has a silicon content higher than a nitrogen content.

4. The method for manufacturing a display device according to claim 1, wherein the second protective film is formed of a silicon nitride and a bonding ratio of silicon and nitrogen in the second protective film is 1 or less.

5. The method for manufacturing a display device according to claim 1, wherein the upper alignment film includes a soluble polyimide, and the lower alignment film includes at least one of a polyamic acid and a polyamic acid ester.

6. The method for manufacturing a display device according to claim 1, wherein the removing the degradation product of the alignment film includes at least one of a cleaning the alignment film and a curing the alignment film.

7. The method for manufacturing a display device according to claim 1, wherein the pixel electrode and the common electrode are formed on the thin film transistor before the forming the alignment film on the protective film.

8. The method for manufacturing a display device according to claim 7, wherein the pixel electrode or the common electrode is configured to be provided with a voltage with at least two frequencies.

9. The method for manufacturing a display device according to claim 1, wherein the thin film transistor includes an active layer formed of amorphous silicon.

10. The method for manufacturing a display device according to claim 1, wherein the upper alignment film has a lower molecular weight than the lower alignment film.

11. The method for manufacturing a display device according to claim 1, wherein the liquid crystal layer includes a negative dielectric anisotropy.

12. A method for manufacturing a display device, the method comprising:
forming a thin film transistor having a gate electrode, an active layer, a source electrode, and a drain electrode on a first substrate;
forming a first protective film on the thin film transistor, wherein the first protective film is formed of an organic material;
forming a common electrode on the first protective film;
forming a second protective film on the first protective film;
forming a pixel electrode on the second protective film, the second protective film and the pixel electrode contacting the thin film transistor through a contact hole formed in the first protective film;
forming a first alignment film and a second alignment film on the first substrate and the second substrate, respectively,
wherein one of the first alignment film and the second alignment film includes an upper alignment film including a photo-degradable material and a lower alignment film without a photo-degradable material,
wherein the lower alignment film having a flat upper surface completely fills the contact hole, and a thickness of the lower alignment film in the contact hole is greater than that of the lower alignment film in other regions,
wherein the contact hole is disposed over the active layer to overlap the active layer, and
wherein an edge of the active layer is protruded from edges of the source and drain electrodes;
forming a liquid crystal layer between the first substrate and a second substrate, the liquid crystal layer having negative dielectric anisotropy; and
wherein the second protective film is formed adjacent to the liquid crystal layer, the second protective film having a lower volume resistance than a volume resistance of the first alignment film, and
wherein the second protective film is formed of a silicon nitride and a bonding ratio of silicon and nitrogen in the second protective film is 1 or less.

13. The method for manufacturing a display device according to claim 12, wherein the volume resistance of the second protective film has $1.0 \square 1013 \square$·cm or less, and the volume resistance of the first alignment film has $1.0 \square 1015 \square$·cm or less.

14. The method for manufacturing a display device according to claim 12, wherein the second protective film is formed of a silicon nitride and has a silicon content higher than a nitrogen content.

15. The method for manufacturing a display device according to claim 12, wherein the pixel electrode or the common electrode is configured to be provided with a voltage with at least two frequencies.

16. The method for manufacturing a display device according to claim 12, wherein at least one of the first alignment film and the second alignment film includes an upper alignment film including a photo-degradable material and a lower alignment film without a photo-degradable material, and the upper alignment film is closer more adjacent to the liquid crystal layer than the lower alignment film.

17. The method for manufacturing a display device according to claim 16, wherein the upper alignment film includes a soluble polyimide, and the lower alignment film includes at least one of a polyamic acid and a polyamic acid ester.

18. The method for manufacturing a display device according to claim 16, wherein the upper alignment film has a lower molecular weight than the lower alignment film.

19. The method for manufacturing a display device according to claim 12, wherein the alignment film is formed of a precursor mixture including a first precursor and a second precursor having different weight-average molecular weights.

20. The method for manufacturing a display device according to claim 19, wherein the first precursor includes a soluble polyimide, and the second precursor includes at least one of a polyamic acid and a polyamic acid ester without a photo-degradable material.

* * * * *